United States Patent
Golden et al.

(10) Patent No.: US 6,572,681 B1
(45) Date of Patent: Jun. 3, 2003

(54) PURIFICATION OF GASES

(75) Inventors: Timothy Christopher Golden, Allentown, PA (US); Alexander Schwarz, Bethlehem, PA (US); Thomas Hsiao-Ling Hsiung, Emmaus, PA (US); Fred William Taylor, Lansdale, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/120,399

(22) Filed: Jul. 22, 1998

(51) Int. Cl.⁷ .................. B01D 53/02; B01D 59/26; C10K 1/34; C01B 3/00
(52) U.S. Cl. .................. 95/122; 423/248; 95/118; 95/123; 95/139; 95/140; 95/116
(58) Field of Search .................. 95/140, 139, 118, 95/122, 123, 116; 423/247, 248

(56) References Cited

U.S. PATENT DOCUMENTS 4,468,238 A * 8/1984 Matsui et al. .................. 55/26
4,717,398 A * 1/1988 Pearce .......................... 55/58
5,238,670 A * 8/1993 Louise et al. ................ 423/351

* cited by examiner

Primary Examiner—Wayne A. Langel
Assistant Examiner—Jonas N. Strickland
(74) Attorney, Agent, or Firm—Geoffrey L. Chase

(57) ABSTRACT

Carbon monoxide (CO) is removed from a nitrogen and CO containing gas stream such as feed air to an air separation process for recovery of a nitrogen product gas stream or a nitrogen product gas stream from an air separation process by adsorbing CO from said gas stream before or after separation of oxygen from said gas stream to produce a product gas stream containing less than 5 ppb of CO by contacting said gas stream With a solid adsorbent such as a Mn, Fe, Ni, Cu, Ag, Pd, Co, Pt or Au exchanged zeolite and periodically regenerating the adsorbent by desorption of CO therefrom under a flow of regenerating gas, and, if said gas stream is said feed air, separating oxygen therefrom to produce said nitrogen product.

10 Claims, 1 Drawing Sheet

PURIFICATION OF GASES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the removal of carbon monoxide and optionally hydrogen from air or nitrogen for the production of high purity nitrogen gas.

In many chemical processes, CO and $H_2$ are undesired species because of their chemical reactivity. For example, the electronics industry requires high purity $N_2$ (less than 5 parts per billion by vol., ppb$_v$, CO and $H_2$) for the production of semiconductor materials. Impurities present in the $N_2$ during formation of the silicon wafers greatly increase chip failure rates. When air is subjected to cryogenic separation to produce $N_2$, since $N_2$ and CO have similar boiling points, CO present in the feed air to the cryogenic column is substantially uneffected by the distillation process. If no special provisions are taken to the distillation process, hydrogen enriches in the product $N_2$ to approximately two and a half times its concentration in the feed air. Therefore, the production of high purity $N_2$, i.e. CO and $H_2$-free $N_2$ for the electronics industry requires either 1) removal of CO and $H_2$ from ambient air prior to the distillation column or 2) post-treatment of the product $N_2$. Often times, electronics customers require both pre and post-treatment for added system reliability.

The current techniques for trace CO and $H_2$ removal involve catalytic conversion of CO to $CO_2$ and $H_2$ to water with subsequent removal of $CO_2$ and water impurities.

In the conventional process for cryogenic separation of air to recover $N_2$ and $O_2$, feed air is compressed, then cooled to low temperature before introduction to a distillation column. Unless water and $CO_2$ are removed from the air before compression, these components will block heat exchangers employed for cooling the gas prior to distillation. The principal method for such removal is thermal swing adsorption (TSA) on molecular sieve. In the TSA system for $CO_2$ and water removal, atmospheric air is compressed to about 100 psig followed by water cooling and removal of the thus condensed water. Then the air, which is then about 100° F. (38° C.), can be further cooled to 40° F. (4.5° C.) using refrigerated ethylene glycol. The bulk of the water is removed in this step by condensation and separation of the condensate. The gas is then passed to a molecular sieve bed or mixed alumina/molecular sieve bed system where the remaining water and $CO_2$ are removed by adsorption. The sorbent beds are operated in a thermal swing mode with equal periods, such as four hours (maybe as long as 24 hours), being devoted to adsorption and to regeneration. By using two beds, one is operated for adsorption while the other is being regenerated and their roles are periodically reversed in the operating cycle. During the regeneration, part of the product gas ($N_2$) or waste stream from the cold box is slightly compressed with a blower and heated to about 260° C. The hot gas is passed through the bed being regenerated, perhaps for two hours, following which the regeneration gas is cooled to typically 4.5° C. for the final two hours, so cooling the bed to that temperature. Regeneration is carried out in a direction counter to that of the adsorption step.

Alternatively, a PSA system may be used. In this case, cycle times are shorter (feed steps are 5–30 minutes), but feed temperature, pressure and regeneration gas remains the same. In the case of PSA, the regeneration gas is not heated.

Such a system is effective for the removal of $CO_2$, water and $C_{3+}$ hydrocarbons from atmospheric air. However, conventional molecular sieve beds are not effective for the removal of CO or $H_2$. The main conventional technique currently used to produce CO-free $N_2$ includes oxidation of CO present in the ambient air to $CO_2$ prior to feeding to the molecular sieve system. This additional catalytic conversion system adds to capital and operating costs of a standard $N_2$ plant. Alternatively, such CO removal steps may be applied to the nitrogen obtained after the air separation process.

In one known method CO is removed from nitrogen using a Ni on alumina catalyst. The principle disadvantages with this material are high cost, the need for activation in reducing gas and the pyrophoric nature of the activated material. Good adsorbents for trace CO removal should preferably be less expensive, easily regenerable and not pyrophoric.

The oxidation of CO to $CO_2$ and $H_2$ to $H_2O$ in the presence of $O_2$ occurs readily at high temperatures (above 500° C.). These reactions can be carried out at lower temperature, about 150° C., in the presence of noble metal catalysts based on palladium or platinum (Ind. Eng. Chem., No. 8, 645, 1961). This technique is currently used as a pre-treatment step for ambient air prior to the frontend adsorption system for $CO_2$ and water removal on a cryogenic air plant. The main disadvantages of this removal technique include 1) high cost of noble metal catalysts, 2) the need to heat the air prior introduction to the catalyst bed, 3) an extra bed and increased plot space is required and 4) the added system pressure drop increases the power requirements of the system.

Ambient temperature processes for the removal of trace impurities from inert gases are also known in the art. U.S. Pat. No. 4,579,723 discloses passing an inert gas stream through a catalyst bed containing a mixture of chromium and platinum on gamma alumina followed by a second bed composed of gamma alumina coated with a mixture of several metals. These beds both convert CO to $CO_2$ and $H_2$ to water and adsorb the resulting impurities to form a high purity product (less than 1 part per million, ppm).

U.S. Pat. No. 4,713,224 teaches a one step process for the purifying gases containing trace quantities of CO, $CO_2$, $O_2$, $H_2$ and $H_2O$ in which the gas stream is passed over a material comprising elemental nickel and having a large surface area. If there is oxygen present, CO is oxidised to $CO_2$ otherwise it is adsorbed. The specification is rather vague as regards the nature of the substrate on which the nickel is supported, referring to it merely as a 'silica-based substrate'.

Processes for the ambient temperature oxidation of CO to $CO_2$ are given in U.S. Pat. Nos. 3,672,824 and 3,758,666.

U.S. Pat. No. 5,110,569 teaches a process for removing CO, $CO_2$, $H_2O$ and optionally $H_2$ from a feed stream (particularly air) comprising 1) initially removing water and carbon dioxide, 2) catalytic oxidation of CO to $CO_2$ and $H_2$ to $H_2O$ and 3) removing the oxidation products. The resulting gas stream may then be purified by cryogenic distillation.

It is suggested in U.S. Pat. No. 4,944,273 that CO can be selectively adsorbed by zeolites doped with metals such as Ca, Co, Ni, Fe, Cu, Ag, Pt, or Ru. Based on this property, it is proposed there to use such doped zeolites in CO sensors, e.g. for use in sensors monitoring automobile exhaust gas systems. However, no demonstration of selectivity is shown in that specification. Also, the highest capacity for adsorbing CO demonstrated is in connection with the Na form of zeolite ZSM 8 and no CO adsorption is shown when the Co form of ZSM 5 or the Ru form of ZSM 8 are tested. Since the units in which adsorption was measured appear to be mis-stated, it is impossible to tell what adsorption capacity in absolute terms these adsorbents were found to have. However, for the purposes of U.S. Pat. No. 4,944,273 it would appear to be the change in electrical properties on exposure to CO that the zeolite exhibits that is important rather than adsorption capacity.

U.S. Pat. No. 4,019,879 discloses the use of a zeolite containing $Cu^+$ ions for adsorbing CO selectively. However, the CO is recovered for use as a reagent from gas streams containing large concentrations of it and there is no indication that such an adsorbent would be effective to remove ppm levels of CO from a gas stream.

U.S. Pat. No. 4,019,880 describes the adsorption of CO on zeolites containing silver cations. The CO concentration can be reduced below as little as 10 ppm CO.

Forster et al, 'Spectroscopic investigations on sorption and oxidation of carbon monoxide in transition metal ion-exchanged zeolites A: Studies on cobalt, nickel and copper forms' Zeolites, 1987, Vol. 7, Nov 517–521, discusses the adsorption of CO on the zeolites referred to in its title. Capacity for adsorption at low ppm levels is not discussed.

U.S. Pat. No. 5,110,569 teaches a process for removing trace quantities of carbon monoxide and hydrogen from an air stream along with larger quantities of carbon dioxide and water as a prelude to cryogenic distillation. The process is conducted by TSA or PSA using a three layer adsorption bed having a first layer for adsorbing water (suitably alumina, silica gel, zeolite or combinations thereof), a second layer of catalyst for converting carbon monoxide to carbon dioxide (suitably nickel oxide or a mixture of manganese and copper oxides) and a third layer for adsorbing carbon dioxide and water (suitably zeolite, activated alumina or silica gel). The second layer may include a catalyst for converting hydrogen to water and this may be supported palladium.

It is not disclosed that any catalyst is capable of both oxidising carbon monoxide to carbon dioxide, and adsorbing the carbon dioxide produced. Nor is it disclosed that supported palladium can be used to convert carbon monoxide to carbon dioxide. Equally, it is not disclosed that the supported palladium used for oxidising hydrogen is capable of adsorbing the water produced.

It is also not apparently the intention that the carbon dioxide present initially should be adsorbed prior to the oxidation of the carbon monoxide.

In FR 2739304, carbon monoxide is first oxidised to carbon dioxide and the carbon dioxide produced together with carbon dioxide and water present initially are then adsorbed using conventional adsorbents. Thereafter, hydrogen is adsorbed on palladium supported on alumina. Metals that can be used in place of palladium are Os, Ir, Rh, Ru, and Pt. It is stated that hydrogen is not oxidised under these conditions. This casts doubt on whether U.S. Pat. No. 5,110,569 is correct in stating that hydrogen can be oxidised on supported palladium or other precious metals.

None of these prior art teachings therefore disclose the ability of the adsorbents discussed to remove CO from a gas stream down to ppb levels. In addition, there is no prior art teachings for trace CO and $H_2$ removal from air in which both CO and $H_2$ impurities are removed via adsorption.

BRIEF SUMMARY OF THE INVENTION

The present invention is a process for the substantial removal of carbon monoxide (CO) from a nitrogen and CO containing gas stream selected from the group consisting of feed air to an air separation process to recover a nitrogen product gas stream and a nitrogen product gas stream from an air separation process, comprising adsorbing CO from said gas stream before or after separation of oxygen from said gas stream to produce a product gas stream containing less than 5 ppb of CO by contacting said gas stream with a solid adsorbent and periodically regenerating the adsorbent by desorption of CO therefrom under a flow of regenerating gas, and, if said gas stream is said feed air, separating oxygen therefrom to produce said nitrogen product.

Preferably, the solid adsorbent is a transition metal exchanged zeolite or a solid support impregnated with a transition metal salt.

Preferably, the transition metal is Mn, Fe, Ni, Cu, Ag, Pd, Co, Pt or Au.

Preferably, the solid support is alumina or silica gel.

Preferably, hydrogen present in said gas stream is adsorbed or is oxidised to water which is then adsorbed.

Preferably, hydrogen is adsorbed by contacting said gas stream with a getter material, a hydrogen bronze or an Ag exchanged 3A zeolite.

Preferably, getter material is an intermetallic alloy.

Preferably, the intermetallic alloy is $LaNi_5$, where one nickel atom optionally is replaced by Pd, Co, Fe, Cr, Ag or Cu; TiFe where Nb, Ta, V or Cu is optionally substituted for Ti or Fe; or $RB_2$ where R is a rare earth element and B is Mn, Fe, Co, or V.

Preferably, hydrogen bronze is $H_xWO_3$ or $H_xMoO_3$.

Preferably the process is further comprising adsorbing water and carbon dioxide from said gas stream prior to said CO removal.

Preferably, water and carbon dioxide removal is carried out by contacting said gas stream with one or more solid adsorbents.

More preferably, the present invention is a process for the substantial removal of carbon monoxide (CO) from a nitrogen and CO containing gas stream, comprising adsorbing CO from said gas stream to produce a product gas stream containing less than 5 ppb of CO by contacting said gas stream with a solid adsorbent comprising a transition metal exchanged zeolite having an Si/Al ratio of 5 or less and periodically regenerating the adsorbent by desorption of CO therefrom under a flow of regenerating gas.

Further more preferably, the present invention is a process for the substantial removal of carbon dioxide, water, carbon monoxide (CO) and hydrogen impurities from a feed air to an air separation process containing said impurities to recover a nitrogen product gas stream, comprising the steps of:

a) adsorbing said water from said feed air on a first adsorbent selective for the adsorption of water over oxygen and nitrogen;

b) adsorbing carbon dioxide from said feed air on a second adsorbent selective for the adsorption of carbon dioxide over oxygen and nitrogen;

c) adsorbing CO from said feed air on a third adsorbent selective for the adsorption of CO over oxygen and nitrogen;

d) adsorbing hydrogen from said feed air on a fourth adsorbent selective for the adsorption of hydrogen over oxygen and nitrogen to produce a product gas stream containing less than 5 ppb of each of said impurities by contacting said gas stream with said first, second, third and fourth adsorbents and periodically regenerating said adsorbents by desorption of said impurities therefrom under a flow of regenerating gas; and e) separating oxygen from said product gas stream to produce said nitrogen product.

Preferably, the third adsorbent is selected from the group consisting of Mn, Fe, Ni, Cu, Ag, Pd, Co, Pt, Au or mixtures thereof exchanged on a zeolite or impregnated on an alumina or silica gel support.

Preferably, the fourth adsorbent is selected from the group consisting of a getter material, a hydrogen bronze, a Ag exchanged 3A zeolite or mixtures thereof.

BRIEF DESCRIPTION OF SEVERAL VIEWS OF THE DRAWINGS

The invention will be further illustrated by the following description of preferred embodiments with reference to the accompanying drawings, in which.

DETAILED DESCRIPTION OF THE INVENTION

Figure 1:
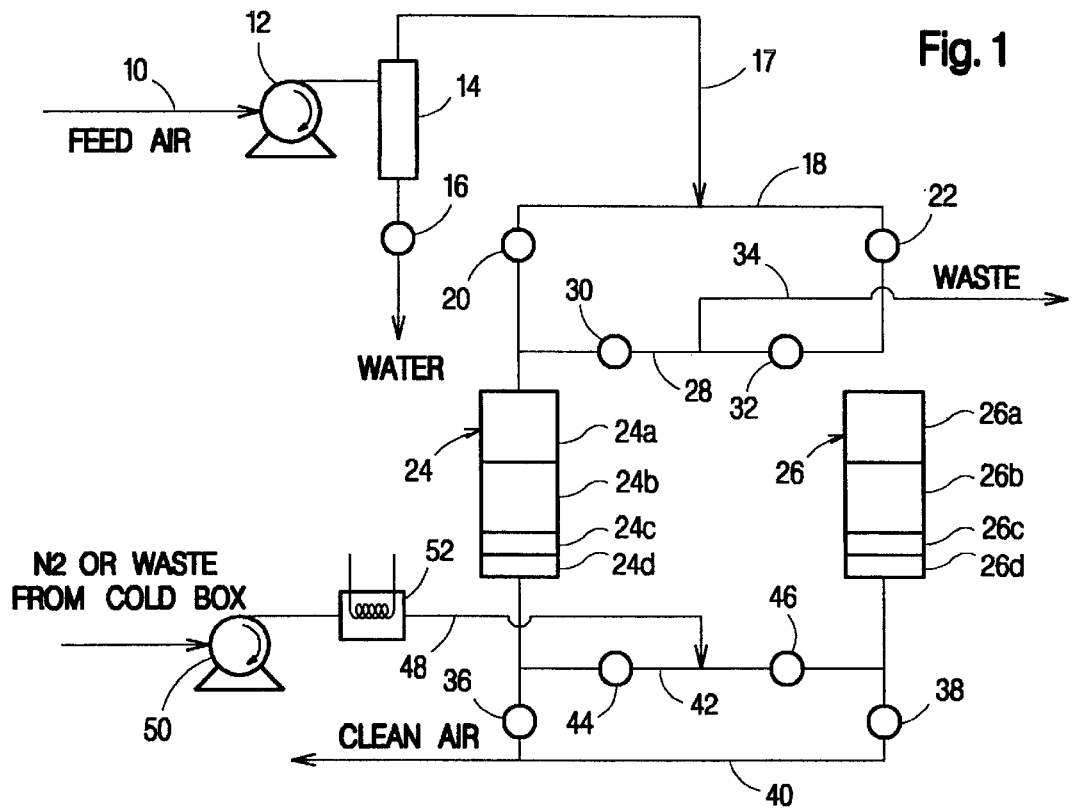
FIG. 1 is a schematic diagram of apparatus for use according to a first embodiment of the invention.

The present invention accordingly provides a process for the removal of carbon monoxide (CO) and hydrogen from a nitrogen and CO containing gas stream selected from the group consisting of feed air to an air separation process to recover a nitrogen product gas stream and a nitrogen product gas stream from an air separation process, comprising adsorbing CO from said gas stream before or after separation of oxygen from said gas stream to produce a product gas stream containing less than 5 ppb$_v$ of CO by contacting said gas stream with a solid adsorbent and periodically regenerating the adsorbent by desorption of CO therefrom under a flow of regenerating gas, and, if said gas stream is said feed air, separating oxygen therefrom to produce said nitrogen product. Optionally, hydrogen present in said gas stream is adsorbed or is oxidised to water which is then adsorbed.

Preferably, the product gas stream contains no more than 3 ppb$_v$, most preferably no more than 1 ppb$_v$ of CO.

As indicated above, the gas stream may be of air which is to be separated into oxygen and nitrogen to produce a stream of nitrogen free from carbon monoxide and optionally also from hydrogen down to ppb levels. This method of operation is referred to as the 'pre-treatment mode.' Alternatively, it may be a stream of nitrogen produced in an air separation unit and then subjected to purification. This is referred to as the 'post-treatment mode.'

The adsorbent for adsorbing CO is preferably a transition metal exchanged zeolite or a solid support impregnated with a transition metal salt. Preferred adsorbents are those with high adsorptive selectivity for CO (and optionally H$_2$) over O$_2$ and N$_2$, and which are regenerable by either ambient temperature purging or heating in a purge gas stream and which have high CO (and optionally H$_2$) capacity at low partial pressure. Examples of transition metal ion exchanged zeolites include Mn, Fe, Ni, Cu, Ag, Pd, Co, Pt and Au exchanged zeolites (A, X, Y, mordenite and chabazite).

Similarly, these transition metal ions impregnated on inorganic supports like alumina or silica gel are useful materials for this purpose.

The zeolite is preferably one having a Si/Al ratio of 5.0 or less, e.g. 2 or less, such as zeolites of the A type (Si/Al=1.0) and X type (Si/Al=1.2). This is in contradistinction to the high Si/Al zeolites such as ZSM-5 used in U.S. Pat. No. 4,019,880, (Si/Al>20).

Optionally, hydrogen present in said gas stream is adsorbed or is oxidised to water which is then adsorbed. Preferably, hydrogen is adsorbed by contacting said gas stream with a metallic getter material, a hydrogen bronze or an Ag exchanged 3A zeolite. Suitable H$_2$ adsorbents include various intermetallic alloys, preferably LaNi$_5$, where one nickel atom could be replaced by Pd, Co, Fe, Cr, Ag and Cu; TiFe with various substitutions of Ti or Fe by Nb, Ta, V or Cu, or RB$_2$ where R is a rare earth element such as Zr and B=Mn, Fe, Co, or V (see "Hydrides of Intermetallic Compounds: Their application in Atomic Industry", Soviet Journal of Nuclear Particles, 19(6) November–December 1988), hydrogen bronzes (preferably H$_x$WO$_3$ or H$_2$Mo$_3$, see for example Inclusion Compounds: Volume 1, Atwood, Davies and MacNicol, editors, Academic Press, 1984, pp303–311) and Ag exchanged 3A zeolite.

When the gas stream is air the process will typically include removing water and carbon dioxide from said gas stream by adsorption prior to said CO removal. This is preferably carried out by contacting said gas stream with one or more solid adsorbents. The adsorbents for water removal include alumina, silica gel, and zeolites like 3A, 4A, 5A and 13X. CO$_2$ removal adsorbents include zeolites like 4A, 5A and 13X, alumina and impregnated alumina.

Thus, in its pre-treatment mode the current invention works by introducing an adsorbent (capable of reversibly chemisorbing CO) at the product end of the front-end air separation unit (ASU) thermal swing adsorber. The adsorbent shows high selectivity for CO over air as well as high capacity for CO at low partial pressures. Optionally, hydrogen present in said gas stream is adsorbed or is oxidised to water which is then adsorbed. This allows the air feed to the cryogenic column to be free of CO$_2$, H$_2$O, H$_2$ and CO. The distillation column is then capable of producing high purity N$_2$.

The starting level of CO will generally be only a trace amount (up to 25 ppm). The final levels of CO is no more than 5 ppb, preferably below 1 ppb. Starting and final values for hydrogen may be similar to those for CO.

Processes according to the invention may be operated by TSA or PSA or variants thereof. In TSA, adsorbent regeneration is accomplished by pressure reduction followed by countercurrent purge with hot gas. In PSA, adsorbent regeneration is generally accomplished by pressure reduction followed by countercurrent purge with ambient temperature gas.

Feed temperatures may be from 5 to 40° C. with feed pressures of 2 to 15 atmospheres. For TSA systems, typical regeneration temperatures are 100 to 400° C. Regeneration gas can consist of N$_2$, O$_2$, Ar, He, air and mixtures thereof.

In a typical preferred embodiment, the feed to the system would be ambient air and the regeneration flow would consist of either product N$_2$ or more desirably waste effluent from the N$_2$ plant (60% O$_2$/40% N$_2$).

If adsorbents for H$_2$ removal are not included, H$_2$ can be rejected in the distillation column.

As shown in FIG. 1, apparatus for use according to the invention comprises an inlet 10 for a gas stream (which in this case is air) leading to a main air compressor 12. Compressed air produced by the main air compressor 12 passes to a cooler 14 in which some of the water present in the air is condensed out and exits via drain valve 16.

The cooled, partially dried air passes via a line 17 to a purification section of the apparatus which in the illustrated case operates by TSA. It should be appreciated however that this the section of the apparatus can be designed to operate by PSA or any of the variants of TSA and PSA known in the art.

Air is received from line 17 into an inlet manifold 18 containing valves 20,22, which connect line 16 to respective adsorption vessels 24,26. Down stream of valves 20,22, the manifold comprises a bridge line 28 containing valves 30,32 by which the vessels 24,26 may respectively be connected to a vent to waste line 34.

The down stream ends of the vessels 24,26 are connected to an outlet manifold comprising valves 36,38 by which the respective vessels are connected to a product outlet line 40. Upstream of the valves 36,38, the manifold comprises a bridge line 42 containing valves 44,46 by which the respective vessels can be connected to a purge gas supply line 48, which leads from a supply of purge gas via a compressor 50 and a heater 52 to connect to bridge line 42 between valves 44 and 46. The supply of purge gas may suitably be from nitrogen separated from air purified in the apparatus shown and then subjected to cryogenic distillation or from air purified in the illustrated apparatus before it is subjected to such distillation.

Within each of the vessels 24 and 26 in FIG. 1, there are three or four layers of adsorbent illustrated. The first two layers are conventional adsorbents for water 24a/26a and carbon dioxide 24b/26b. Suitably these are activated alumina and zeolite respectively. However, any suitable adsorbent or adsorbents for water and carbon dioxide removal may be used as known in the art and these two layers may be combined into a single layer of adsorbent.

The third layer illustrated is of carbon monoxide adsorbent 24c/26c, preferably a transition metal exchanged zeolite as described above. The fourth layer is of a hydrogen adsorbent 24d/26d, such as a metallic getter material as described above.

Figure 2:
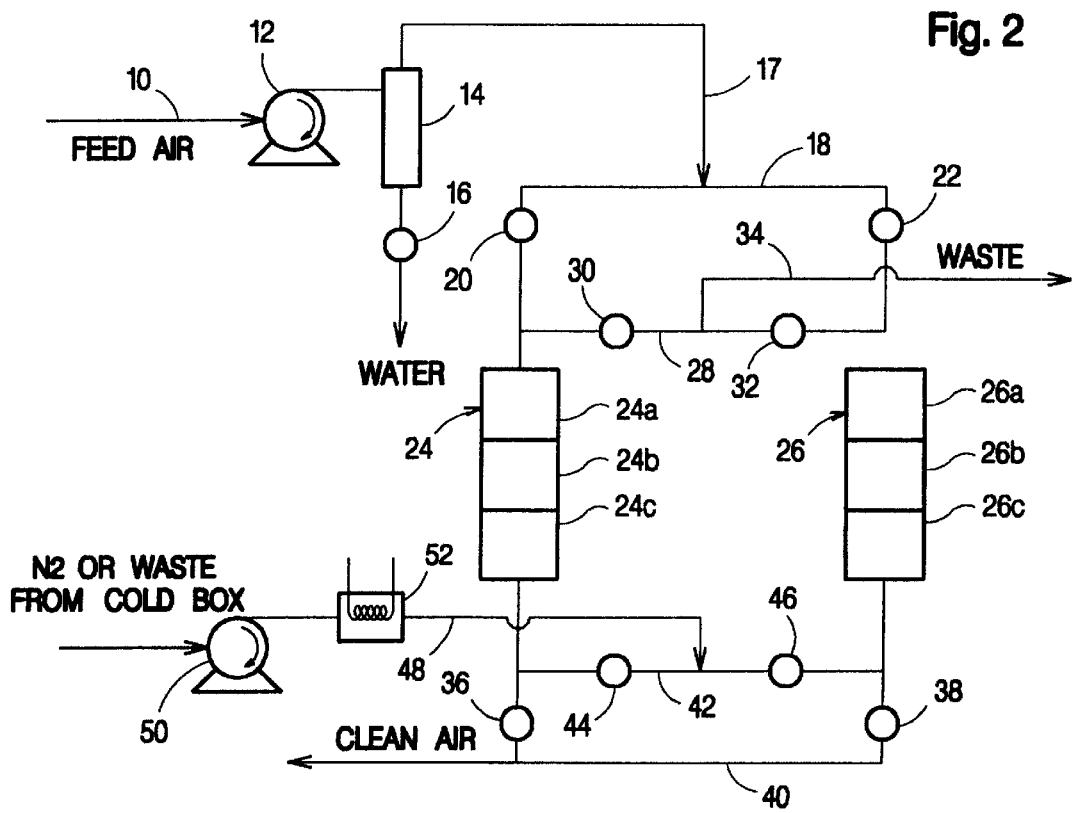
FIG. 2 is a schematic diagram of apparatus for use according to a second embodiment of the invention.

In FIG. 2, the components of the apparatus are as shown in FIG. 1, but the vessels 24 and 26 now contain three layers corresponding to the water 24a/26a, carbon dioxide 24b/26b and carbon monoxide 24c/26c adsorbent layers described in relation to FIG. 1. Hydrogen is not adsorbed. This system is therefore only suitable for use where removal of trace quantities of hydrogen is not a requirement or where hydrogen will be removed subsequently.

In an alternate embodiment, the apparatus components are once again the same as depicted in FIG. 1. However, layer 24d/26d, instead of being only a hydrogen adsorbent is a hydrogen oxidation catalyst and adsorbent which is a layer of chromium and platinum on γ-alumina as described in U.S. Pat. No. 4,579,723. This layer both oxidises hydrogen to water and adsorbs the water produced.

In a further alternate embodiment, the apparatus is once again unchanged from FIG. 1, but rather than a hydrogen adsorbent in layer 24d/26d, a hydrogen oxidation catalyst and a further desiccant material, such as activated alumina or zeolite, is mixed with the oxidation catalyst to form the layer 24d/26d.

EXAMPLES

The following examples give procedures for the production of useful adsorbents for adsorptive separation and removal of trace CO from gas streams as well as adsorption characteristics which demonstrate the utility of these adsorbents.

Example 1

40 grams of UOP 4A zeolite was equilibrated with 1 liter of 0.5 M cobalt (II) acetate solution for 16 hours at 25° C. The ion exchanged zeolite was then extracted from the supernatant solution and washed with 8 liters of distilled water. The material was then air dried at 120° C. for 16 hours. X-ray florescence measurements on the finished product showed that the zeolite was 91% Co(II) exchanged.

After preparation of the adsorbent, CO and $N_2$ adsorption isotherms were measured on the material at 30° C. following thermal activation in flowing $N_2$ (4 cc/g/min)at 260° C. for 16 hours. The Henry's law constants (initial isotherm slopes) for CO and $N_2$ adsorption and Henry's law selectivities ($K_{CO}/K_{N2}$) are shown in Table 1. Table 1 also shows the corresponding values for as-received 4A zeolite. The results in Table 1 clearly show that Co(II) exchange of 4A zeolite vastly improves (a 300 fold increase) the $CO/N_2$ selectivity (S) of the adsorbent. This high selectivity for CO is the first adsorbent requirement. The CO adsorption characteristics are completely restored by thermal regeneration in $N_2$ at 260° C. This result shows that the high selectivity is retained by simple thermal regeneration in $N_2$ and does not require reduction to restore the CO capacity. The final requirement of the adsorbent is high CO capacity at low partial pressure. Table 1 shows that the CO capacity at $2.5 \times 10^{-3}$ atm (1.9 torr) is quite high, 150 times higher than the untreated 4A.

TABLE 1

| Adsorbent | (mmole/g/atm) $K_H$ CO @ 30° C. | (mmole/g/atm) $K_H$ $N_2$ @ 30° C. | S | (mmole/g) n CO @ 30° C. 1.9 torr |
|---|---|---|---|---|
| UOP 4A | 1.2 | 0.30 | 4.0 | 0.003 |
| Co(II) A | 585 | 0.48 | 1219 | 0.44 |

To test the utility of this adsorbent for trace CO removal from air, TGA experiments were carried out. About 25 mg of the CO(II)A zeolite was placed in a flow through TGA apparatus and thermally regenerated in $N_2$ (100 cc/min) to 260° C. The material was then cooled to 30° C. in zero air ($CO_2$ and water free). At that point, a zero air stream with 20 ppm CO was admitted and the weight uptake attributed to CO adsorption measured. Under these conditions, the amount of CO adsorbed was 0.17 mmole/g (0.34 wt %). This result shows that the material has a high capacity for CO even at low concentrations in the presence of air as the bulk carrier.

Example 2

40 grams of CaX from LaPorte Industries was ion exchanged with 1 liter of 0.1 N $AgNO_3$ at 25° C. for 16 hours. After ion exchange the sample was washed with 8 liters of distilled water. The adsorption of CO and was measured on the untreated and ion exchanged samples at 30° C. after the sample was thermally regenerated in flowing $N_2$ at 400° C. for 12 hours. The Henry's Law constants and selectivities are given in the table below:

| Absorbent | (mmole/g/atm) $K_H$ CO | (mmole/g/atm) $K_H$ $N_2$ | $S_H$ |
|---|---|---|---|
| CaX | 18.2 | 1.5 | 12.1 |
| Ag/CaX | 125.0 | 0.3 | 416.7 |

The results show that exchange of $Ag^+$ in CaX zeolite produces an adsorbent with the properties required for trace CO removal, i.e., 1) high $CO/N_2$ selectivity and 2) high CO capacity at low CO partial pressure.

Example 3

40 grams of 4A zeolite from UOP was ion exchanged with 1 liter of 0.1 N copper (II) acetate at 25° C. for 16 hours. After ion exchange the sample was washed with 8 liters of distilled water and air dried for 12 hours at 120° C. Prior to adsorption measurements the sample was regenerated in flowing $N_2$ at 400° C. for another 12 hours. The results of CO and $N_2$ adsorption at 30° C. are given in the table below:

| Absorbent | (mmole/g/atm) $K_H$ CO | (mmole/g/atm) $K_H$ $N_2$ | $S_H$ |
|---|---|---|---|
| 4A | 1.42 | 0.30 | 4.7 |
| Cu/NaA | 47.2 | 0.25 | 189 |

The results show that Cu(II) ion exchange in A zeolite produces an adsorbent with high $CO/N_2$ selectivity and high CO capacity at low partial pressure.

Example 4

40 grams of LaRoche alumina grade 201 was impregnated with 17 ml of an aqueous solution which contained 12.4 grams of $CuCl_2$ and 1.6 grams of ammonium citrate dibasic. The sample was then air dried at 120° C. for 16 hours then thermally activated in flowing $N_2$ at 200° C. for 12 hours. The adsorption of CO and $N_2$ was then measured at 30° C. in a standard volumetric adsorption unit. The adsorption results are shown in the table below:

| Absorbent | (mmole/g/atm) $K_H$ CO | (mmole/g/atm) $K_H$ $N_2$ | $S_H$ |
|---|---|---|---|
| LaRoche 201 | 0.066 | 0.046 | 1.40 |
| $CuCl_2$/LaRoche | 7.5 | 0.010 | 750 |

The results show that impregnation of an alumina support with $CuCl_2$ drastically increases the $CO/N_2$ selectivity and the CO Henry's Law constant of the adsorbent, both of which properties are desired for a trace CO removal adsorbent.

Example 5

A PSA air purification was conducted to demonstrate the ability of an adsorbent to remove trace CO from ambient air. A inch (2.5 cm) diameter by 6 feet (183 cm) long adsorption column was filled with CuCl impregnated NaY zeolite. Air with 10 ppm CO was fed to the column at 22° C., 100 psig (690 kPa) and a flow rate of 1 SCF/min (0.03 m³/min). The PSA process was run with a molar purge to air (P/A) ratio of 0.3 with a purge pressure of 10 psig (69 kPa). After 100 cycles, the CO concentration in the bed at the end of feed was determined. It was found that 2 feet (61 cm) of adsorbent bed was required to totally remove (less than 20 ppb) all the feed CO.

As stated previously, when it is required or desirable to remove hydrogen to meet a hydrogen specification in the nitrogen product, hydrogen is adsorbed by contacting said gas stream with a metallic getter material, a hydrogen bronze or an Ag exchanged 3A zeolite. Suitable $H_2$ adsorbents include various intermetallic alloys, preferably $LaNi_5$, where one nickel atom could be replaced by Pd, Co, Fe, Cr, Ag and Cu; TiFe with various substitutions of Ti or Fe by Nb, Ta, V or Cu, or $RB_2$ where R is a rare earth element such as Zr and B=Mn, Fe, Co, or V; hydrogen bronzes (preferably $H_xWO_3$ or $H_2Mo_3$) and Ag exchanged 3A zeolite. The hydrogen adsorbent is preferably a layer of the overall adsorbent column or bed which follows the CO adsorbent. The hydrogen adsorbent is regenerated using elevated temperatures. The identified hydrogen adsorbents have sufficient capacity for trace levels of hydrogen in air and are sufficiently selective for hydrogen adsorption over co-adsorption of air, nitrogen or oxygen to be commercially useful and practical adsorbents in this duty.

Example 6

Trace amounts $H_2$ can be removed from ambient air by adsorption and/or complexation with a variety of agents. For example, it would be possible to ion exchange 3A zeolite with an appropriate cation, like $Ag^+$, to produce such an adsorbent. This adsorbent would have $H_2$ specific adsorption sites inside the small pore zeolite cavity which does not allow entrance of larger molecules like $O_2$ and $N_2$. It is also known in the literature that intermetallic alloys can concentrate $H_2$ via hydride formation. These materials are usually investigated with respect to $H_2$ storage, but the materials would exhibit $H_2$ removal selectivity and would also be thermally regenerable. The literature also notes that intercalation compounds of $H_2$ are known. For example, $WO_3$ has a framework structure with large empty channels. The formation of $H_{0.22}WO_3$ can be achieved by treatment with $H_2$. This type of material would reversibly adsorb $H_2$ in a thermal swing adsorption system.

The present invention offers a unique solution to the requirements of atmospheric industrial gases for the electronics industry. Electronic grade nitrogen requires very high purity specifications, including very low (single digit ppb) levels of CO and hydrogen, as well as water and carbon dioxide. The prior art has attempted to meet these requirements with a combination of adsorption and catalytic oxidation of CO and hydrogen. This prior art scheme complicates the design and operation of such systems, including performance of regeneration. In contrast, the present invention provides removal of trace levels of CO and hydrogen, as well as water and carbon dioxide, to very low levels, typically ppb levels, in an all-adsorption bed or using catalysis only for hydrogen removal if necessary. The present invention's use of adsorption for CO removal from feed air or product nitrogen from a cryogenic air separation process provides advantages of capacity and selectivity in a simplified process and system over the prior art.

The present invention has been set forth with regard to several preferred embodiments, but the full scope of the present invention should be ascertained from the claims which follow.

What is claimed is:

1. A process for the substantial removal of carbon monoxide (CO) from a nitrogen and CO containing gas stream, containing up to 25 ppm of CO, selected from the group consisting of (1) feed air to an air separation process for the recovery of a nitrogen product gas stream and (2) a nitrogen product gas stream from an air separation process, comprising adsorbing CO from said gas stream by contacting said gas stream with a solid adsorbent consisting of a Mn, Fe, Ni, Ag or Co exchanged zeolite or a solid support impregnated with a Mn, Fe, Ni, Ag or Co salt and adsorbing hydrogen from said gas stream by contacting said gas stream with a metallic getter material, a hydrogen bronze or an Ag exchanged 3A zeolite before or after separation of oxygen from said gas stream to produce a product gas stream containing less than 5 ppb of CO and periodically regenerating the adsorbent by desorption of CO therefrom under a flow of regenerating gas, and, if said gas stream is said feed air, separating oxygen therefrom to produce a nitrogen product containg less than 5 ppb CO.

2. A process as claimed in claim 1, wherein said solid support is alumina or silica gel.

3. A process as claimed in claim 1, wherein said metallic getter material is an intermetallic alloy.

4. A process as claimed in claim 3, wherein said intermetallic alloy is $LaNi_5$, where one nickel atom optionally is replaced by Pd, Co, Fe, Cr, Ag or Cu; TiFe where Nb, Ta, V or Cu is optionally substituted for Ti or Fe; or $RB_2$ where R is a rare earth element and B is Mn, Fe, Co, or V.

5. A process as claimed in claim 1, wherein said hydrogen bronze is $H_xWO_3$ or $H_xMoO_3$.

6. A process as claimed in claim 1, further comprising adsorbing water and carbon dioxide from said gas stream prior to said CO removal.

7. A process as claimed in claim 6, wherein said water and carbon dioxide removal is carried out by contacting said gas stream with one or more solid adsorbents.

8. A process for the substantial removal of carbon monoxide (CO) and hydrogen from a nitrogen, CO and hydrogen containing gas stream, containing up to 25 ppm of CO, comprising adsorbing CO and hydrogen from said gas stream to produce a product gas stream containing less than 5 ppb of CO and less man 5 ppb of hydrogen by contacting said gas stream with a solid adsorbent comprising a Mn, Fe, Ni, Ag or Co exchanged zeolite having an Si/Al ratio of 5 or less and with a metallic getter material, a hydrogen bronze or an Ag exchanged 3A zeolite, and periodically regenerating the adsorbent by desorption of CO therefrom under a flow of regenerating gas.

9. A process for the substantial removal of carbon dioxide, water, carbon monoxide (CO) and hydrogen impurities from a feed air to an air separation process containing said impurities to recover a nitrogen product containing gas stream, comprising the steps of:

(a) adsorbing said water from said feed air on a first adsorbent selective for the adsorption of water relative to oxygen and nitrogen;

(b) adsorbing carbon dioxide from said feed air, containing up to 25 ppm of CO, on a second adsorbent selective for the adsorption of carbon dioxide relative to oxygen and nitrogen;

(c) adsorbing CO from said feed air on a third adsorbent selective for the adsorption of CO relative to oxygen and nitrogen selected from the group consisting of Mn, Fe, Ni, Ag and Co and mixtures thereof exchanged on a zeolite or impregnated on a solid support;

(d) adsorbing hydrogen from said feed air on a fourth adsorbent selective for the adsorption of hydrogen relative to oxygen and nitrogen selected from the group consisting of a metallic getter metal, a hydrogen bronze, a Ag exchanged 3A zeolite and mixtures thereof to produce a product gas stream containing less than 5 ppb of each of said impurities by contacting said gas stream with said first, second, third and fourth adsorbents and periodically regenerating said adsorbents by desorption of said impurities therefrom under a flow of regenerating gas; and (e) separating oxygen from said product gas stream to produce said nitrogen product.

10. The process of claim 9 wherein said solid support is an alumina or silica gel support.

* * * * *